(12) United States Patent
Casella

(10) Patent No.: US 8,287,625 B2
(45) Date of Patent: Oct. 16, 2012

(54) SYSTEMS AND METHODS FOR TREATING LANDFILL GAS USING LANDFILL LEACHATE

(75) Inventor: Douglas R. Casella, Mendon, VT (US)

(73) Assignee: Casella Waste Systems, Inc., Rutland, VT (US)

(*) Notice: Subject to any disclaimer, the term of this patent is extended or adjusted under 35 U.S.C. 154(b) by 0 days.

(21) Appl. No.: 13/152,988

(22) Filed: Jun. 3, 2011

(65) Prior Publication Data
US 2011/0236961 A1 Sep. 29, 2011

Related U.S. Application Data

(63) Continuation of application No. 11/878,586, filed on Jul. 25, 2007, now Pat. No. 7,955,419.

(51) Int. Cl.
*B01D 53/02* (2006.01)
(52) U.S. Cl. .............. 95/148; 95/90; 95/136; 95/181; 405/129.1; 405/129.2; 405/129.25; 405/129.27; 405/129.95
(58) Field of Classification Search ............ 95/90, 136, 95/148, 181; 405/129.1, 129.2, 129.25, 129.27, 405/129.95
See application file for complete search history.

(56) References Cited

U.S. PATENT DOCUMENTS

| | | | | |
|---|---|---|---|---|
| 4,552,572 A * | 11/1985 | Galstaun | ................. | 95/161 |
| 4,568,364 A * | 2/1986 | Galstaun et al. | ............ | 95/176 |
| 5,605,417 A | 2/1997 | Englert et al. | | |
| 5,924,047 A * | 7/1999 | Gold et al. | ................. | 588/317 |
| 6,063,348 A * | 5/2000 | Hinke et al. | ............... | 423/235 |
| 6,090,356 A * | 7/2000 | Jahnke et al. | ............. | 423/210 |
| 6,334,737 B1 | 1/2002 | Lee | | |
| 6,364,572 B1 | 4/2002 | Hudgins et al. | | |
| 6,742,962 B2 | 6/2004 | Hater et al. | | |
| 6,929,423 B2 | 8/2005 | Kittle | | |
| 7,789,945 B2 * | 9/2010 | Lechnick et al. | ........... | 95/236 |
| 7,955,419 B2 | 6/2011 | Casella | | |
| 2004/0191755 A1 | 9/2004 | Kemper et al. | | |
| 2006/0222464 A1 | 10/2006 | Schwalbe | | |
| 2007/0246406 A1 * | 10/2007 | Dibel et al. | ............. | 210/96.2 |

* cited by examiner

*Primary Examiner* — Duane Smith
*Assistant Examiner* — Christopher P Jones
(74) *Attorney, Agent, or Firm* — Wilmer Cutler Pickering Hale and Dorr LLP

(57) ABSTRACT

Embodiments of the present invention are directed to systems and methods for treating landfill gas using landfill leachate. In one embodiment of the present invention, a method includes receiving landfill leachate from at least one of a plurality of sources, and pretreating the landfill leachate to adjust at least one chemical property of at least one component of the landfill leachate. The leachate contacts landfill gas, so that at least one component of the landfill gas chemically reacts with at least one component of the landfill leachate to form a spent landfill leachate and a treated landfill gas. The method also includes recycling a first portion of the spent landfill leachate, recirculating a second portion of the spent landfill leachate to at least one of the plurality of sources, and subjecting the treated landfill gas to flare.

8 Claims, 2 Drawing Sheets

SYSTEMS AND METHODS FOR TREATING LANDFILL GAS USING LANDFILL LEACHATE

CROSS REFERENCE TO PRIOR APPLICATIONS

This application is a continuation of U.S. patent application Ser. No. 11/878,586 filed Jul. 25, 2007, now U.S. Pat. No. 7,955,419 issued Jun. 7, 2011, and is hereby incorporated by reference in its entirety.

BACKGROUND OF THE INVENTION

1. Field of the Invention

Embodiments of the present invention generally relate to the treatment of toxic gases and, more particularly, to systems and methods for treating landfill gas using landfill leachate.

2. Background of the Invention

Landfills are a source of toxic gases known as landfill gases. The major components of landfill gas are methane ($CH_4$), carbon dioxide ($CO_2$) and nitrogen ($N_2$). There are also minor amounts of oxygen ($O_2$), other organic compounds, halides, and hydrogen sulfide ($H_2S$). At present, landfill gas can, for example, be vented to the atmosphere, burned in boilers, flared, and/or used as a natural gas substitute after the $CO_2$ is removed from landfill gas. In the United States and most of the developed world, environmental regulations require landfills to recover landfill gas in order to minimize landfill gas emissions.

Landfills are characteristically odorous facilities, as the incoming waste is odorous. Placing the incoming waste in the landfill and covering it with soil typically mitigates odor, but does not eliminate it. A substantial contributor to odor is water, which facilitates aerobic and/or anaerobic decomposition of landfill trash, thereby promulgating and exacerbating odor problems. During anaerobic decomposition, sulfate salts such as gypsum from discarded wallboard in the landfill waste, can produce hydrogen sulfide, a particularly odorous material. The more water present, the more odorous substances are generally produced. Therefore, landfill operating procedures typically encourage minimizing water contact with landfill waste in order to mitigate odor problems at the landfill. For decades, landfills have been operated as dry as possible, even though the incoming trash may, for example, contain approximately 25 weight percent water.

When a landfill cell is completed (i.e., filled), the contained waste is a loaf-like mass, typically wrapped in a plastic barrier and entombed in several feet of soil. The base of the loaf-like mass typically includes a leachate collection system used to collect liquid draining from the landfill contents, while the outer surface prevents entry of moisture from the environment. One exemplary leachate collection system is described in U.S. Publication No. 20060222464, published Oct. 5, 2006, entitled *Aerobic and Anaerobic Waste Management Systems and Methods for Landfills*, which is incorporated herein by reference. Despite these measures, the encapsulated waste is still wet, perhaps 15 weight percent water on average.

Once the cell closure is completed, the internal chemistry starts to operate, producing landfill gas and leading eventually to methane production. Initially, oxygen in the system is consumed via oxidation of the trash, thereby producing carbon dioxide and water. The gas that is produced is evacuated by the gas collection system and the liquid water is evacuated via the leachate collection system. When all the oxygen has been consumed, the internal chemistry becomes anaerobic, thereby producing a chemically reduced gas instead of a chemically oxidized gas.

Anaerobic decomposition of landfill waste allows the sulfate salts to be reduced, producing small amounts of hydrogen sulfide which, in turn, may cause several problems, such as odor problems, corrosion of gas recovery hardware, increasing SOx emissions from flaring or other combustion processes, and possible adverse health consequences for workers. The odor threshold for hydrogen sulfide is extremely low (0.05 to 0.1 ppmv), and levels of hydrogen sulfide above 10 ppmv are considered toxic. Moreover, levels of hydrogen sulfide above 1000 ppmv (0.1 V %) in a breathing zone can rapidly lead to unconsciousness and death. Thus, worker health and safety issues may require special attention at sites with high hydrogen sulfide.

Hydrogen sulfide removal from gas and liquid streams is a developed technology, generally involving metal ion catalysis. In general, these hydrogen sulfide removal processes are designed to remove the hydrogen sulfide gas contained in a process stream. For example, a gas stream exiting from a landfill can be delivered to a gas treatment plant for purification. These process schemes can remove hydrogen sulfide in gas streams, thereby reducing or eliminating corrosion problems and/or combustion exhaust gas emission problems.

Exemplary conventional hydrogen sulfide treatment systems used to mitigate hydrogen sulfide in landfill gas are SulfaTreat® (SulfaTreat*, Chesterfield, Mont.) and Mini-Cat™ (Lo-Cat®, Merichem Company, Houston, Tex.). In general, these systems use fixed-bed or batch type granular hydrogen sulfide reactants contained in pressurized vessels. Hydrogen sulfide is removed from a gas stream via a chemical reaction with reactants in the vessel. However, all these techniques tend to be costly. Further, these techniques create another problem relating to the disposal of spent material.

We have determined that a need exists for a cost-effective process to reduce toxic and offensive gases, such as hydrogen sulfide, that are generated by and from landfills.

SUMMARY OF EMBODIMENTS OF THE INVENTION

Figure 1:
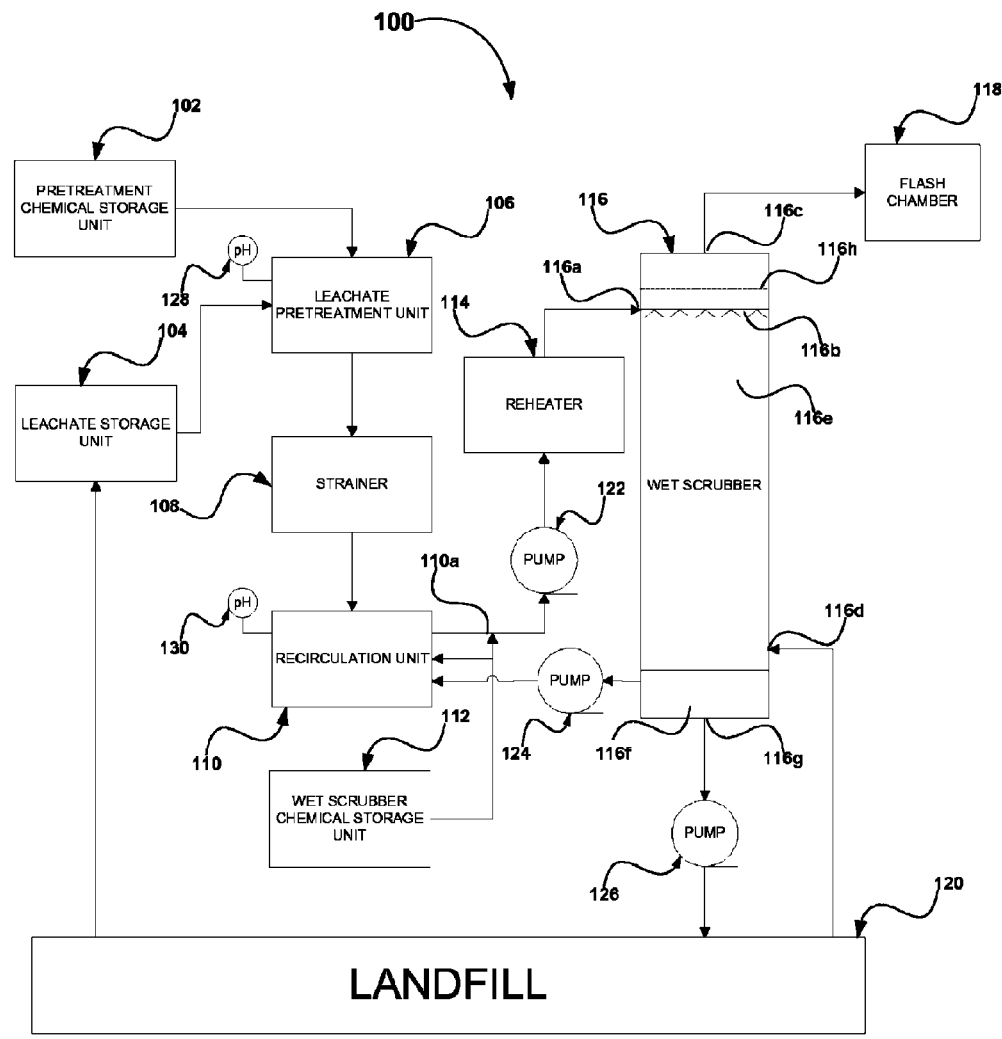
FIG. 1 is an exemplary embodiment of a landfill gas treatment system using landfill leachate in accordance with the present invention.

Embodiments of the present invention are directed to systems and methods that can be used to reduce toxic and offensive gases, such as hydrogen sulfide, that are generated by and from landfills. Embodiments of the present invention do not require the use of fresh water, but instead use landfill leachate to scrub hydrogen sulfide from landfill gas to generate a biodegradable, non-hazardous waste that can be disposed in a wastewater treatment system and/or optionally re-introduced into the landfill.

Accordingly, the present invention relates to system and method for treating landfill gas using landfill leachate, which include the operative steps of: receiving landfill leachate from at least one of a plurality of sources; treating the landfill leachate to adjust at least one chemical property of at least one of a plurality of components of the landfill leachate; contacting the treated landfill leachate with landfill gas, the landfill gas comprising at least two components, at least one component of the landfill gas chemically reacting with the at least one component of the landfill leachate to form a spent landfill leachate and a treated landfill gas; recycling a first portion of the spent landfill leachate; recirculating a second portion of the spent landfill leachate to at least one of the plurality of sources; and subjecting the treated landfill gas to flare.

In one embodiment of the present invention, the method for treating landfill gas may further include the steps of heating the treated landfill leachate. More specifically, the landfill leachate is heated to about 150 degree C. In another embodiment, the method includes the step of mixing the landfill leachate with at least one caustic. The caustic is selected from a group consisting of sodium hydroxide, potassium hydroxide, lithium hydroxide, calcium hydroxide, barium hydroxide and strontium hydroxide. In yet another embodiment, the method for treating landfill gas may further includes the step of mixing the landfill leachate with at least one oxidant. The oxidant is selected from a group consisting of hydrogen peroxide, hypochlorite, halogens, chlorite, chlorate, perchlorate, permanganate salts, ammonium cerium(IV) nitrate, chromic and dichromic acids, chromium trioxide, pyridinium chlorochromate (PCC), chromate/dichromate compounds, Tollen's Reagent, sulfoxides, persulfuric acid, ozone, and osmium tetroxide ($OsO_4$).

Embodiments of the present invention are directed to treating landfill gas using landfill leachate to adjust at least one chemical property of at least one of a plurality of components of the landfill leachate, wherein the chemical property comprises pH ranging from about 10 to about 14. In one embodiment, the pH of landfill leachate is adjusted to at least 11.

In a method according to one embodiment of the present invention, at least one of the plurality of components of the landfill leachate comprises a metal. More specifically, the metal is selected from a group consisting of silver, copper, tungsten, vanadium, molybdenum, titanium, niobium, iron, uranium, and zinc. In another embodiment, the plurality of components of the landfill leachate comprises a polymeric amine.

In a method according to another embodiment of the present invention, at least one component of the landfill gas is selected from a group consisting of methane, carbon dioxide, nitrogen, oxygen, and halides. More specifically, at least one component of the landfill gas comprises hydrogen sulfide. In one embodiment, the treated landfill gas comprises from about 1% to about 10% hydrogen sulfide.

In a method according to yet another embodiment of the present invention, treating the landfill leachate comprises mixing the landfill leachate with at least one of a plurality of enzymes.

Embodiments of the present invention are directed to a method for removing hydrogen sulfide from landfill gas using landfill leachate, comprising: treating the landfill leachate with at least one of a plurality of enzymes, wherein at least one of the enzymes adjusts the pH of the landfill leachate; introducing the landfill gas into a landfill gas recapture device, wherein at least a portion of the hydrogen sulfide in the landfill gas is absorbed by the treated landfill leachate; withdrawing from the landfill gas recapture device a spent landfill leachate laden with absorbed hydrogen sulfide; regenerating a first portion of the spent landfill leachate laden with absorbed hydrogen sulfide to form a regenerated landfill leachate; recycling the regenerated landfill leachate to the landfill gas recapture device; and disposing a second portion of the spent landfill leachate laden with absorbed hydrogen sulfide to a landfill.

In one embodiment of the present invention, the pH is adjusted from about 10 to about 14. More specifically, the pH is adjusted to at least 11.

In another embodiment of the present invention, hydrogen sulfide in the landfill gas that is absorbed by the treated landfill leachate is from about 50% to about 90%. More specifically, hydrogen sulfide in the landfill gas that is absorbed by the treated landfill leachate is from about 60% to about 80%.

In yet another embodiment of the present invention, the regenerated first portion of the spent landfill leachate is from about 5% to about 25%.

In one embodiment, the method for removing hydrogen sulfide from landfill gas using landfill leachate further comprises withdrawing the landfill gas, from the landfill gas recapture device, that is substantially free of hydrogen sulfide; and subjecting the landfill gas to flashing.

Embodiments of the present invention are directed to a system for treating landfill gas using landfill leachate, comprising: a treatment unit for treating landfill leachate; a landfill gas recapture device for contacting the treated landfill leachate with landfill gas, the landfill gas comprising at least two components, at least one component of the landfill gas chemically reacting with the landfill leachate to form a spent landfill leachate and a treated landfill gas; a recirculation unit for recirculating a first portion of the spent landfill leachate to the landfill gas recapture device; and a flash chamber for subjecting the treated landfill gas to flare.

In one embodiment, the system for treating landfill gas using landfill leachate further comprises a storage unit for storing landfill leachate. In another embodiment, the system for treating landfill gas using landfill leachate further comprises a reheater for heating the treated landfill leachate. In yet another embodiment, the system for treating landfill gas using landfill leachate further comprises a pump for recycling a second portion of the spent landfill leachate to a source of the landfill leachate.

Embodiments of the present invention are directed to a system for removing hydrogen sulfide from landfill gas, comprising: a treatment unit for treating the landfill leachate with at least one of a plurality of enzymes, wherein at least one of the enzymes adjusts the pH of the landfill leachate; a landfill gas recapture device to facilitate absorption of hydrogen sulfide in the landfill gas by the treated landfill leachate from the treatment unit; a nozzle for introducing the landfill gas into the landfill gas recapture device; a first pump for withdrawing a first portion of spent landfill leachate laden with absorbed hydrogen sulfide from the landfill gas recapture device; a recirculation unit for regenerating a first portion of the spent landfill leachate laden with absorbed hydrogen sulfide; a second pump for recycling the regenerated landfill leachate from the regeneration unit to the landfill gas recapture device; and a flash chamber for subjecting at least a portion of the landfill gas from the landfill gas recapture device to flashing.

In one embodiment, the system for removing hydrogen sulfide from landfill gas further comprises a third pump for disposing a second portion of the spent landfill leachate laden with absorbed hydrogen sulfide to a landfill. In another embodiment, the system for removing hydrogen sulfide from landfill gas further comprises a landfill gas recapture device chemical storage unit for introducing additives to a first portion of spent landfill leachate in the recirculation unit. In yet another embodiment, the system for removing hydrogen sulfide from landfill gas further comprises a treatment chemical storage unit for storing the at least one of the plurality of enzymes.

DETAILED DESCRIPTION OF EMBODIMENTS OF THE INVENTION

Embodiments of the present invention are directed to systems and methods for treating landfill gas using landfill leachate and, more particularly, to systems and methods for removing hydrogen sulfide from landfill gas using landfill leachate as the scrubbing liquid. Referring now to the drawings and, more particularly, to FIG. 1, there is shown a system, generally designated 100, which incorporates a preferred embodiment of the present invention. System 100 includes at least a pretreatment chemical storage unit 102, at least one leachate storage unit 104, at least one leachate pretreatment unit 106, at least two pH sensors 128 and 130, at least one strainer 108, at least one recirculation unit 110, at least one landfill gas recapture device chemical storage unit 112, at least one reheater 114, at least one landfill gas recapture device 116, and/or at least one flash chamber 118.

Leachate storage unit 104 temporarily stores the leachate collected from at least one landfill 120, and controls the amount of the leachate introduced into leachate pretreatment unit 106. Leachate storage unit 104 can be one or more stainless steel tanks, poly tanks, frac tanks, bulk tanks, glass-lined tanks, and the like. For a normal purge treatment of surplus leachate that is effluent from landfill 120, one or more embodiments of the present invention may utilize a standard post-treatment device (not shown) such as an aeration tank, a chemical treatment tank, a sedimentation tank, and/or a rotating contact oxidation treatment tank. In at least one embodiment, standard post treatment device is positioned between landfill 120 and leachate storage unit 104. Leachate pretreatment unit 106 facilitates the pretreatment of leachate from leachate storage unit 104 with pretreatment chemicals received from pretreatment chemical storage unit 102. pH sensor 128 determines pH of leachate from leachate storage unit 104 while being treated in leachate pretreatment unit 106 and facilitates the control of pretreatment chemicals received from pretreatment chemical storage unit 102. In at least one embodiment of the present invention, pretreatment chemical storage unit 102 maintains the temperature of pretreatment chemicals above freezing temperatures. In at least one embodiment of the present invention, leachate pretreatment unit 106 is a reaction vessel with lined interior surface. Exemplary vessels include glass-lined vessels, ceramic lined vessels, brick lined vessels, and the like.

Strainer 108, positioned proximate leachate pretreatment unit 106, facilitates the removal of particulates and/or dissolved sulfates found in leachate that could plug and/or limit mass transfer or acid-base neutralization of the leachate. Pretreated and strained landfill leachate is used as a scrubbing liquid in landfill gas recapture device 116. Recirculation unit 110 maintains adequate supply of the scrubbing liquid to landfill gas recapture device 116.

In one or more embodiments of the present invention, landfill gas recapture device 116 includes at least one vertical column (not shown), in which the leachate flows downward and the gases may flow upward in a counter-current manner. In one embodiment of the present invention, landfill gas recapture device 116 can be configured to handle emission streams of differing flow rates. Pump 122 pumps leachate through inlet 116a under pressure into an upper portion of landfill gas recapture device 116, shown as absorption zone 116e. Leachate is sprayed within absorption zone 116e using, for example, nozzles 116b, which can be organized in a manifold-like manner covering the horizontal cross section of landfill gas recapture device 116, at one or several different heights. Exemplary nozzles can include velocity nozzles, magnetic nozzles, spray nozzles, shaping nozzles, pattern nozzles and the like. In one or more embodiments of the present invention, nozzles 116b receive recirculated scrubbing liquid from recirculation unit 110 which, in turn, has an intake side that is operably connected to sump 116f.

In another embodiment of the present invention, pump 122 provides recirculated scrubbing liquid from recirculation unit 110 to nozzles 116b. The resulting scrubbing liquid drops exiting from nozzle 116b flows downward, and is collected at by sump 116f. At least a portion of the drops emanating from nozzle 116b will contact each other and coalesce into larger drops.

Landfill gases from landfill 120 are introduced into landfill gas recapture device 116 via, for example, a horizontal duct at gas inlet 116d (located towards a bottom portion of landfill gas recapture device 116). The landfill gases will flow vertically upwards, against the flow of drops emanating from nozzle 116b. In one or more embodiments of the present invention, a droplet separator 116h is provided upstream of scrubbed gas outlet 116c, which is positioned at or near the head of landfill gas recapture device 116. Above the upper row of nozzles 116b, landfill gases are usually demisted from entrained droplets before being discharged.

At or near the bottom portion of landfill gas recapture device 116, sump 116f feeds a first portion of spent leachate to recirculation unit 110 and a second portion of spent leachate to landfill 120. In one or more embodiments of the present invention, pump 124 recycles the first portion of spent landfill leachate from sump 116f to recirculation unit 110, and pump 126 disposes the second portion of spent leachate to landfill 120. Exemplary pumps can include centrifugal pumps, electromagnetic pumps, jet pumps, screw pumps, gear pumps, lobe pumps, sliding vane pumps, and the like. In one embodiment of the present invention, pump 124 is a Fibroc 1500 Series Electrical Centrifugal Pump. Recirculating unit 110 regenerates spent leachate by mixing pretreated leachate from leachate pretreatment unit 106, landfill gas recapture device chemical from landfill gas recapture device chemical storage unit 112, and a first portion of spent leachate that is recycled from sump 116f to recirculation unit 110. A second portion of spent leachate from sump 116f is returned to landfill 120. Landfill gas recapture device chemical storage unit 112 stores and introduces additives to recycled spent leachate liquid in recirculation unit 110. In one or more embodiments of the present invention, landfill gas recapture device chemical storage unit 112 introduces additives in outlet portion 110a of recirculation unit 110. pH sensor 130 determines the pH of leachate in recirculation unit 110, and facilitates control of the first portion of spent leachate supplied by sump 116f and additives supplied by landfill gas recapture device chemical storage unit 112. Recirculation unit 110 provides regenerated leachate to nozzles 116b through outlet 110a, and spent leachate liquid drops are collected by sump 116f. One or more embodiments of the present invention include reheater 114, which can be positioned between recirculation unit 110 and nozzles 116b and used to heat the leachate scrubbing liquid in order to maintain a proper viscosity of the landfill leachate prior to its introduction into landfill gas recapture device 116. In one embodiment of the present invention, the temperature of leachate scrubbing liquid is greater than the temperature of the landfill gas entering landfill gas recapture device 116 via, for example, a horizontal duct at gas inlet 116d. In another embodiment of the present invention, the temperature of leachate scrubbing liquid is from about 100° F. to about 200° F. and the temperature of the landfill gas entering landfill gas recapture device 116 is from about 50° F. to about 100° F. In yet another embodiment of the present invention, the temperature of leachate scrubbing liquid is from about 120° F. to about 165° F. and the temperature of the landfill gas entering landfill gas recapture device 116 is from about 80° F. to about 135° F.

Scrubbed landfill gas moves upward in landfill gas recapture device 116 to exit via outlet 116c, and is optionally subjected to flashing in flash chamber 118. In one or more embodiments of the present invention, scrubbed landfill gas is cooled in a cooling tower (not shown) to condense leachate vapors escaping via outlet 116c with scrubbed landfill gas.

Figure 2:
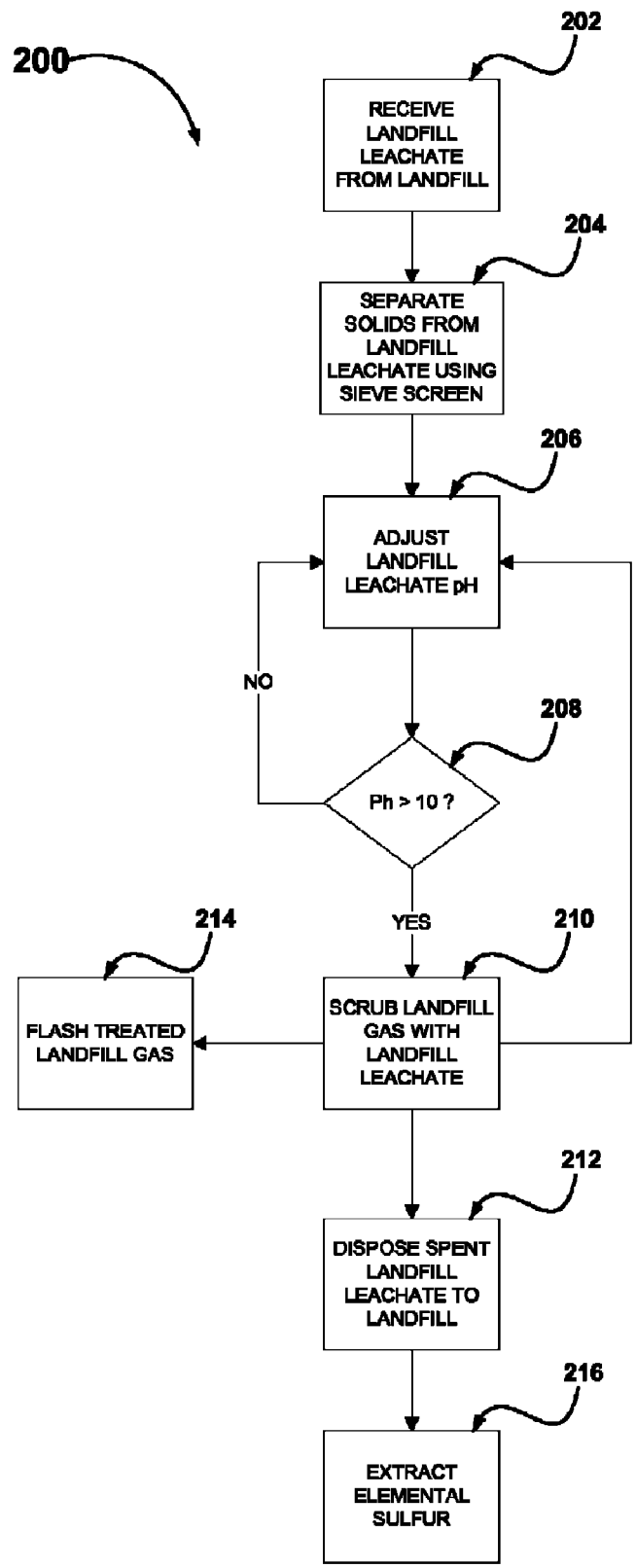
FIG. 2 is an exemplary flow diagram in accordance with an exemplary embodiment of the landfill gas treatment system of the present invention.

FIG. 2, generally at 200, shows an exemplary method in accordance with an embodiment of the present invention. At step 202, leachate storage unit 104 receives landfill leachate from landfill 120. Landfill leachate is screened at step 204 to remove any unwanted solids. In one embodiment of the present invention, landfill leachate is screened using a sieve screen. At step 206, landfill leachate is pretreated in leachate pretreatment unit 106 with chemicals received from pretreatment chemical storage unit 102. In one or more embodiments of the present invention, pretreatment of landfill leachate includes adjusting the pH of the landfill leachate using one or more pretreatment chemicals. In one or more embodiments of the present invention, pretreatment chemicals include caustics. Exemplary caustics include sodium hydroxide, potassium hydroxide, lithium hydroxide, calcium hydroxide, barium hydroxide and strontium hydroxide. In one embodiment of the present invention, pretreatment of landfill leachate includes adding caustics at a rate of about 10 gallons per hour to about 50 gallons per hour. In another embodiment of the present invention, pretreatment of landfill leachate includes adding causticsat a rate of about 15 gallons per hour to about 25 gallons per hour. In one or more embodiments of the present invention, landfill leachate is pretreated with enzymes. In one or more embodiments of the present invention, the pH of the landfill leachate is adjusted from approximately 7 to approximately 13. In one or more embodiments of the present invention, the pH of the landfill leachate is adjusted from approximately 9 to approximately 12. In one or more embodiments of the present invention, the pH of the landfill leachate is adjusted from approximately 9.5 to approximately 11.5. In one or more embodiments of the present invention, the pH of the landfill leachate is adjusted to about 8. In one or more embodiments of the present invention, pretreatment of landfill leachate includes changing the oxidation state of at least one component of the landfill leachate. Exemplary components of the landfill leachate include silver, tungsten, vanadium, molybdenum, titanium, niobium, iron, uranium compounds, polymeric amines, sulfates, and the like. In one or more embodiments of the present invention, additional pretreatment chemicals include oxidizing additives. Exemplary oxidizing additives include hydrogen peroxide, hypochlorite, halogens, chlorite, chlorate, perchlorate, permanganate salts, ammonium cerium(IV) nitrate, chromic and dichromic acids, chromium trioxide, pyridinium chlorochromate (PCC), chromate/dichromate compounds, Tollen's Reagent, sulfoxides, persulfuric acid, ozone, osmium tetroxide ($OsO_4$), and the like. In one embodiment of the present invention, pretreatment of landfill leachate includes adding an oxidant at a rate of about 1 gallon per hour to about 20 gallons per hour. In another embodiment of the present invention, pretreatment of landfill leachate includes adding an oxidant at a rate of about 2 gallon per hour to about 15 gallons per hour.

At decision step 208, pH sensor 128 is used to determine if the pH of the landfill leachate is greater than 10. If the pH of the landfill leachate is less than or equal to 10, pretreatment chemicals from pretreatment chemicals storage unit 102 is added at step 206 to adjust the pH. TABLE 1 below provides an exemplary listing of the amount of pretreatment chemicals needed in order to adjust the pH of landfill leachate.

TABLE 1

| pH of landfill leachate | Pretreatment chemicals added (% vol./vol. landfill leachate) |
|---|---|
| 7 | 18 |
| 6 | 20 |
| 5 | 25 |
| 4 | 30 |

If the pH of the landfill leachate is greater than 10, then, at step 210, pretreated landfill leachate in leachate pretreatment unit 106 is contacted with landfill gas, from landfill 120, in landfill gas recapture device 116. The contact results in partial absorption of at least one component of the landfill gases by at least one component of the pretreated landfill leachate. In another embodiment of the present invention, the contact results in at least one chemical reaction of at least one component of the landfill gases with at least one component of the pretreated landfill leachate. Exemplary components of the landfill gas include at least one of methane, carbon dioxide, nitrogen, oxygen, halides, hydrogen sulfide, and other organic compounds. Exemplary components of the landfill leachate include at least one of silver, tungsten, vanadium, molybdenum, titanium, niobium, iron, uranium compounds, polymeric amines, sulfates, and the like. In one or more embodiments of the present invention, the contact of landfill gas with pretreated landfill leachate results in absorption of hydrogen sulfide by at least one component of the landfill leachate. Related "contaminants" increase surface area for additional absorption. In another embodiment of the present invention, the contact of landfill gas with landfill leachate results in a chemical reaction of hydrogen sulfide with at least one component of the landfill leachate.

In one or more embodiments of the present invention, at step 210, landfill gas is scrubbed with pretreated landfill leachate to substantially remove hydrogen sulfide from the landfill gas. In another embodiment of the present invention, landfill gas is scrubbed with pretreated landfill leachate to remove, for example, at least 80% of hydrogen sulfide from the landfill gas. In yet another embodiment of the present invention, landfill gas is scrubbed with pretreated landfill leachate to remove at least 90% of hydrogen sulfide from the landfill gas. TABLE 2 below provides exemplary operating conditions of landfill gas recapture device 116 to facilitate removal of hydrogen sulfide from landfill gas.

TABLE 2

| % $H_2S$ Removal | Leachate input through inlet 116a (gpm) | Landfill gas input through inlet 116d (-CFM) | Recycled Leachate to recirculation unit 110 (gpm) | Recycled Leachate to landfill 120 (gpm) |
|---|---|---|---|---|
| 90 | 10 | 8 | 2 | 8 |
| 80 | 8 | 6 | 4 | 6 |
| 70 | 6 | 4 | 2 | 4 |
| 60 | 4 | 2 | 1 | 3 |

At step 210, a first portion of the spent leachate from landfill gas recapture device 114 is returned to step 206. At step 206, the returned spent leachate is mixed with pretreated leachate from leachate pretreatment unit 106, and the mixture is regenerated in recirculation unit 110. In one or more embodiments of the present invention, the regeneration step includes adjusting the pH of spent leachate-pretreated leachate mixture within recirculation unit 110, with landfill gas recapture device chemicals from landfill gas recapture device chemical storage unit 112. Exemplary wet scrubbing chemicals include scrubber treatment A, scrubber treatment B, and the like. TABLES 3-5 provide exemplary listings of the amount of landfill gas recapture device chemicals from landfill gas recapture device chemical storage unit 112 that can be used to adjust the pH of spent leachate-pretreated leachate mixture in recirculation unit 110.

TABLE 3

For pH = 8

| Pretreated leachate (% vol.) | Spent leachate (% vol.) | Landfill gas recapture device chemicals (% vol./vol. pretreated-spent leachate mixture) |
|---|---|---|
| 20 | 80 | 40 |
| 40 | 60 | 30 |
| 60 | 40 | 20 |
| 80 | 20 | 10 |

TABLE 4

For pH = 9

| Pretreated leachate (% vol.) | Spent leachate (% vol.) | Landfill gas recapture device chemicals (% vol./vol. pretreated-spent leachate mixture) |
|---|---|---|
| 20 | 80 | 50 |
| 40 | 60 | 40 |
| 60 | 40 | 30 |
| 80 | 20 | 20 |

TABLE 5

For pH = 10

| Pretreated leachate (% vol.) | Spent leachate (% vol.) | Landfill gas recapture device chemicals (% vol./vol. pretreated-spent leachate mixture) |
|---|---|---|
| 20 | 80 | 60 |
| 40 | 60 | 50 |
| 60 | 40 | 40 |
| 80 | 20 | 30 |

At step 212, pump 126 withdraws a second portion of the spent leachate resulting from step 208, and disposes the second portion of the spent leachate in landfill 120. In one embodiment of the present invention, the first portion of the spent landfill leachate that is recycled and regenerated is about 50% of spent landfill leachate collected in sump 116f. In another embodiment of the present invention, the first portion of the spent landfill leachate that is recycled and regenerated is about 30% of spent landfill leachate collected in sump 116f. At step 216, elemental sulfur may be extracted from disposed landfill leachate.

At step 214, scrubbed landfill gas produced from step 210 is subjected to downstream processing. For example, in one embodiments of the present invention, scrubbed landfill gas produced from step 210 is flash treated in flash chamber 118. In another embodiment of the present invention, the scrubbed landfill gas is subjected to additional scrubbing to remove carbon dioxide. In yet another embodiment of the present invention, the scrubbed landfill gas is subjected to additional scrubbing to isolate methane.

Methods and systems in accordance with embodiments of the present invention can be applied in various ways. One or more embodiment(s) of the present invention relate to a method and composition of reducing or scavenging hydrogen sulfide and/or organic sulfides in gaseous and/or liquid hydrocarbons and aqueous systems. Many industries are presently concerned with hydrogen sulfide and/or organic sulfides reduction (or removal) in their operations. System and methods in accordance with one or more embodiments of the present invention can also be utilized by industries where sulfide reduction or removal is desired. The following industries, operations and streams are but some of the examples of where one or more embodiments of the present invention may be useful for removing or reducing sulfides: (1) Petroleum energy industries, including, for example, oil field operations, gas plant operations, and refining, which may use one or more embodiments of the present invention to scavenge sulfides from produced gas, processed gas, crude oil, residual hydrocarbons, liquefied petroleum gas, carbon dioxide gas, produced water, waterfloods, waste water disposal, drilling fluids, and/or vapor space in liquid hydrocarbon storage and shipping containers; (2) Manufacturing industries, which may use one or more embodiments of the present invention in applications such as steel plant coke oven gas; (3) Mining operations, which may use one or more embodiments of the present invention to clean their coal seam gas or sour gas in gold, silver, helium, and other mines where hydrogen sulfide is a problem or nuisance; (4) Geothermal energy industries, which may use one or more embodiments of the invention for water conditioning; (5) Municipal and industrial waste water treatment plants, which may use one or more embodiments of the invention in the context of anaerobic digestor gas, nuisance odor control, and municipal or industrial sludge; and (6) The pulp and paper mill industries, which may use one or more embodiments of the invention to remove hydrogen sulfide and mercaptans.

Embodiments of the present invention use algorithms to balance the costs of chemical vs. the removal efficiency. In one embodiment, the algorithm takes into account the carrying capacity of the caustic and oxidant in the leachate, and eliminating the use of clean water. One or more embodiments of the present invention is useful is shifting the $H_2S$ emissions from air back to the landfill, thus, allowing for the stabilization of the H2S in the landfill and then harvesting the elemental sulfur. Systems and methods in accordance with one or more embodiments of the present invention readjusts the mass balance of the landfill by extracting sulfur and other contaminants, and re-introducing leachate to positively increase the eligible mass release of gas through increased access to gas activation sites throughout the landfill. The acceleration of those activation sites thereby creates additional air space and extending the life of the landfill. Systems and methods in accordance with one or more embodiments of the present invention also reduce landfill carbon footprint by accelerating the release of biogenic carbon previously absorbed out of the atmosphere. The methane collected and converted into renewable energy then displaces the biogenic harvesting of coal and fossil fuels.

Landfill gas treatment systems and methods in accordance with one or more embodiments of the present invention, and their attendant advantages, will be understood from the foregoing description and it will be apparent that various changes may be made in the form, construction, or arrangement of parts thereof without departing from the spirit and scope of the invention or sacrificing all of its material advantages, the form hereinbefore described being merely preferred or exemplary embodiments thereof.

Those familiar with the art will understand that embodiments of the invention may be employed, for various specific purposes, without departing from the essential substance thereof. The description of any one embodiment given above is intended to illustrate an example rather than to limit the invention. This above description is not intended to indicate that any one embodiment is necessarily preferred over any other one for all purposes, or to limit the scope of the invention by describing any such embodiment, which invention scope is intended to be determined by the claims, properly construed, including all subject matter encompassed by the doctrine of equivalents as properly applied to the claims.

I claim:

1. A system for removing hydrogen sulfide from landfill gas including a treatment unit, a recapture device and a recirculation unit, comprising:
   the treatment unit including at least one of a plurality of enzymes to treat the landfill leachate with the at least one of a plurality of enzymes, wherein a first pH sensor is attached to the treatment unit to determine the pH level of the leachate in the treatment unit;
   the landfill gas recapture device, distinct from a landfill mass, facilitates absorption of hydrogen sulfide in the landfill gas extracted from a landfill by the treated landfill leachate from the treatment unit;
   a nozzle configured to introduce the landfill gas into the landfill gas recapture device;
   a first pump that withdraws a first portion of spent landfill leachate laden with absorbed hydrogen sulfide from the landfill gas recapture device;
   the recirculation unit regenerates the first portion of the spent landfill leachate laden with absorbed hydrogen sulfide,
   a second pH sensor is attached to the recirculation unit that determines the pH level of the leachate in the recirculation unit;
   a second pump that recycles the regenerated landfill leachate from the recirculation unit to the landfill gas recapture device.

2. The system of claim 1, further comprising a flash chamber configured to subject at least a portion of the landfill gas from the landfill gas recapture device to flashing.

3. The system of claim 1, further comprising a third pump configured to dispose a second portion of the spent landfill leachate laden with absorbed hydrogen sulfide to a landfill.

4. The system of claim 1, further comprising a landfill gas recapture device chemical storage unit configured to introduce additives to a first portion of spent landfill leachate in the recirculation unit.

5. The system of claim 1, further comprising a treatment chemical storage unit configured to store the at least one of the plurality of enzymes.

6. The system of claim 1, wherein at least one of the enzymes adjusts the pH of the landfill leachate in accordance with the pH sensor coupled to the treatment unit.

7. The system of claim 1, wherein the first portion of the spent leachate is mixed with the leachate in the treatment unit in accordance with the values of pH read by the pH sensor coupled to the recirculation unit.

8. The system of claim 1, wherein the landfill gas recapture device comprises at least one vertical column for directing landfill leachate in a downward direction in a counter-current manner.

* * * * *